US011938474B2

(12) United States Patent
Hilti

(10) Patent No.: US 11,938,474 B2
(45) Date of Patent: Mar. 26, 2024

(54) DEVICE AND METHOD FOR DETERMINING THE QUALITY OF PULSED DISPENSING OF LIQUID ACCORDING TO THE AIR DISPLACEMENT PRINCIPLE

(71) Applicant: HAMILTON BONADUZ AG, Bonaduz (CH)

(72) Inventor: Jonas Hilti, Balzers (LI)

(73) Assignee: HAMILTON BONADUZ AG, Bonaduz (CH)

( * ) Notice: Subject to any disclaimer, the term of this patent is extended or adjusted under 35 U.S.C. 154(b) by 400 days.

(21) Appl. No.: 17/283,296

(22) PCT Filed: Oct. 8, 2019

(86) PCT No.: PCT/EP2019/077260
§ 371 (c)(1),
(2) Date: Apr. 7, 2021

(87) PCT Pub. No.: WO2020/074538
PCT Pub. Date: Apr. 16, 2020

(65) Prior Publication Data
US 2021/0322969 A1 Oct. 21, 2021

(30) Foreign Application Priority Data
Oct. 11, 2018 (DE) ......................... 102018125196.3

(51) Int. Cl.
*B01L 3/02* (2006.01)

(52) U.S. Cl.
CPC ........... *B01L 3/0237* (2013.01); *B01L 3/0227* (2013.01); *B01L 3/0268* (2013.01);
(Continued)

(58) Field of Classification Search
CPC .... B01L 3/0268; B01L 3/0227; B01L 3/0237; B01L 2200/143; B01L 2400/0487; B01L 2400/021; B01L 2200/0605
(Continued)

(56) References Cited

U.S. PATENT DOCUMENTS 5,916,524 A * 6/1999 Tisone ............... G01N 35/1009 239/371
6,662,122 B2 * 12/2003 Salje ..................... B01L 3/0227 702/50

(Continued)

FOREIGN PATENT DOCUMENTS

DE 102015214566 2/2017
DE 102016225209 6/2018

(Continued)

OTHER PUBLICATIONS

German PTO Search Report for DE 102018125196.3 dated May 29, 2019.

(Continued)

*Primary Examiner* — Jacques M Saint Surin
(74) *Attorney, Agent, or Firm* — Tollefson IP

(57) ABSTRACT

A pipette device comprises a pipette channel filled with compressible working gas, a pipette piston movable along the pipette path, a piston drive, which drives the pipette piston, a control device, a data memory connected to the control device for signal transmission, a pressure sensor which detects the pressure of the working gas and which is connected to the control device, a position sensor which detects a position of the pipette piston and which is connected to the control device. The control device is designed to determine a quality of a dispensing sequence on the basis of a target residual quantity value, which represents the target residual quantity of dosing liquid remaining in the pipette channel, of a working gas pressure and of an end
(Continued)

Figure 1:
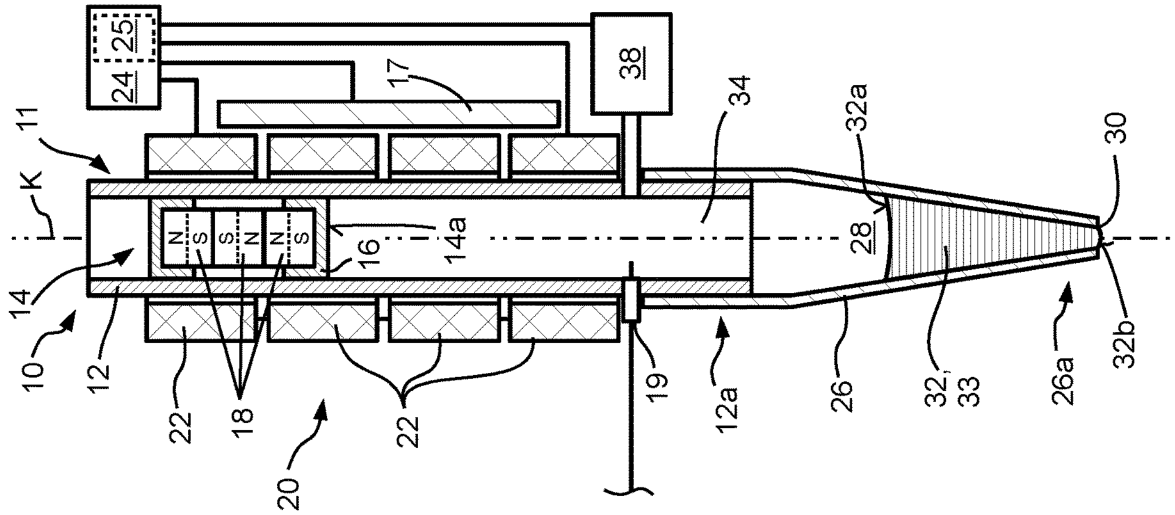

position of the pipette piston, in each case after the end of the dispensing sequence, and to output the determined quality.

19 Claims, 4 Drawing Sheets

(52) U.S. Cl.
CPC . *B01L 2200/0605* (2013.01); *B01L 2200/143* (2013.01); *B01L 2400/021* (2013.01); *B01L 2400/0487* (2013.01)

(58) Field of Classification Search
USPC .......................................................... 73/864.18
See application file for complete search history.

(56) References Cited

U.S. PATENT DOCUMENTS

| | | | | | |
|---|---|---|---|---|---|
| 7,439,076 | B1 * | 10/2008 | Tokiwa | G01N 35/1016 | 422/562 |
| 7,964,160 | B2 * | 6/2011 | Zuppiger | B01L 3/021 | 422/503 |
| 8,551,788 | B2 * | 10/2013 | Ingenhoven | B01L 3/021 | 141/2 |
| 9,631,616 | B2 * | 4/2017 | Trump | G01N 35/1016 | |
| 10,632,460 | B2 | 4/2020 | Romer et al. | | |
| 11,504,708 | B2 * | 11/2022 | Romer | G01F 11/029 | |
| 2002/0188410 | A1 | 12/2002 | Salje | | |
| 2006/0123930 | A1 * | 6/2006 | Czernecki | B01L 3/021 | 73/863.02 |
| 2014/0010667 | A1 | 1/2014 | Trump et al. | | |
| 2018/0008976 | A1 * | 1/2018 | Luebbert | B01L 3/021 | |
| 2018/0185836 | A1 | 7/2018 | Romer et al. | | |
| 2021/0154659 | A1 * | 5/2021 | Romer | B01L 3/0237 | |
| 2023/0211334 | A1 * | 7/2023 | Gysel | B01L 3/0227 | 422/504 |

FOREIGN PATENT DOCUMENTS

| | | | |
|---|---|---|---|
| DE | 102017201114 | | 7/2018 |
| EP | 1250956 | A1 | 10/2002 |
| EP | 1614468 | A1 | 1/2006 |

OTHER PUBLICATIONS

International Search Report with Written Opinion for PCT/EP2019/077260 dated Dec. 2, 2019.
English translation dated Apr. 8, 2021, of the International Preliminary Report on Patentability under Chapter I issued for PCT/EP2019/077260 dated Dec. 2, 2019.

* cited by examiner

DEVICE AND METHOD FOR DETERMINING THE QUALITY OF PULSED DISPENSING OF LIQUID ACCORDING TO THE AIR DISPLACEMENT PRINCIPLE

CROSS-REFERENCE TO RELATED APPLICATIONS

This application is the National Stage of International Application No. PCT/EP2019/077260, filed on Oct. 8, 2019, which claims the benefit of German Application No. 10 2018 125 196.3, filed on Oct. 11, 2018. The entire contents of both applications are hereby incorporated herein by reference.

BACKGROUND OF THE INVENTION

This invention concerns a pipetting device, comprising:

A pipetting channel extending along a channel path and filled at least in part with a compressible working gas, A pipetting piston accommodated movably in the pipetting channel along the channel path, A piston drive, configured for impelling the pipetting piston to move along the channel path in order to modify the pressure of the working gas in the pipetting channel by means of piston motion, A control device, configured for actuating the piston drive, A data memory linked with the control device to allow signal transmission, A pressure sensor that acquires the pressure of the working gas and that is linked with the control device so as to allow signal transmission, A piston position sensor that acquires a position of the pipetting piston and that is linked with the control device so as to allow signal transmission, where the control device is configured for impelling the pipetting piston to a dispensing motion for pulsed single-volume dispensing of a single volume of not more than 1 μl, where the dispensing motion for each single-volume dispensing comprises two motion sections in opposite directions along the channel path and where through the dispensing motion for single-volume dispensing an overpressure pulse is generated in the working gas for a duration of not more than 50 ms.

Such a pipetting device configured for pulsed dispensing of dosing liquid with whip-like piston motion is known from 10 2016 225 209 A1. The pulsed dispensing of a dosing liquid with whip-like motion of the pipetting piston described in it serves, as does the pulsed dispensing of the current invention, for the dispensing of small and smallest liquid quantities with a single volume of not more than 1 μl from a dosing liquid supply accommodated in the pipetting channel of the pipetting device. The whip-like piston motion leads to an altogether asynchronous relationship between piston motion and liquid dispensing—in contrast to conventional liquid dispensing, where synchronously or quasi-synchronously with the piston motion and the thereby effected pressure increase of the working gas in the pipetting channel, dosing liquid is dispensed from the pipetting channel.

In the case of asynchronous dispensing with whip-like dispensing motion of the pipetting piston, the pipetting piston is moved with quantitatively high acceleration in the dispensing direction, where the piston's motion is reversed abruptly in direction and the piston, again with quantitatively high acceleration, is moved in the opposite direction. For pulsed dispensing of a single volume of dosing liquid, the pipetting piston is moved both in the dispensing direction and against the dispensing direction. During its motion in the dispensing direction for single-volume dispensing, the pipetting piston's surface normally sweeps out at least ×1.4 of the single-dosing volume before the piston's direction of motion is reversed abruptly. Due to the abrupt direction reversal and the occurring quantitatively high accelerations and decelerations of the pipetting piston, the piston's motion resembles a whiplash, resulting in its name.

Through the described whip-like dispensing motion, an overpressure pulse of not more than 50 ms in duration is generated in the working gas of the pipetting channel which, transmitted from the working gas to the dosing liquid supply, ensures that a dispensing droplet is ejected from the dosing liquid supply accommodated in the pipetting channel. In contrast to the conventional synchronous dispensing of dosing liquids described above, in which a dispensed liquid droplet after its detachment from the pipetting device is accelerated away from the pipetting aperture of the pipetting channel only with gravitational acceleration, in asynchronous pulsed dispensing with whip-like piston motion there is added to the unavoidable gravitational acceleration acting on the detached dispensing droplet a detachment acceleration effected by the "hard" overpressure pulse in the working gas. The detachment acceleration is directed along the pipetting channel's axis away from the pipetting channel at the point of the droplet's detachment.

The duration of the overpressure pulse is the time interval from the point in time at which the pipetting piston, starting from a state of rest or a state of low velocity of less than 100 μl/s taking its piston surface into consideration, is accelerated at least at $10^6$ μl/$s^2$ in the dispensing direction, to the point in time at which the pressure of the working gas has returned for the first time to its original level.

The volume velocity and volume acceleration are used as the velocities and accelerations of the pipetting piston. A volume velocity is the velocity that is dependent on the piston surface of the pipetting piston, at which the pipetting piston sweeps out a volume. A volume acceleration is the change in volume velocity with time.

This application concerns solely pipetting devices working according to the air displacement principle described above, in which a compressible working gas along the channel path between the pipetting piston and a dosing liquid supply accommodated in the pipetting channel are provided. The pipetting piston, therefore, does not come into contact with the dosing liquid supply in the pipetting channel.

The pulsed dispensed liquid droplet is detached at the meniscus located nearer to the pipetting aperture of the dosing liquid supply. The meniscus can be located at the pipetting aperture at the time of detachment or away from it in the pipetting channel.

DE 10 2016 225 209 A1 further discloses bringing the dosing liquid supply accommodated in the pipetting channel, out of which the small dosing liquid quantities are dispensed, before single-volume dispensing, into a state in which a meniscus located nearer to the pipetting aperture of the dosing liquid supply is disposed inside the pipetting channel at a distance from the pipetting aperture and/or exhibits an essentially flat shape, through motion of the pipetting piston and thus through adjustment of the working gas pressure. The pipetting device of the current invention and its control device are also configured for this pre-conditioning, i.e. for performing such a dispensing-preparatory piston motion.

The working gas pressures at which different quantities of dosing liquid supply in the pipetting channel exhibit an essentially flat meniscus located nearer to the pipetting aperture, with the possible exception of the meniscus edge regions wetting the pipetting channel wall, can be determined experimentally in the laboratory for one or several dosing liquids before putting the pipetting device into use, in each case for a variety of dosing liquid quantities, and recorded in the data memory.

The asynchronous dispensing of dosing liquid with whip-like dispensing motion of the pipetting piston is especially suitable for aliquoting numerous small single volumes, since asynchronous air-displacement dispensing makes possible accurately repeatable dispensing of single volumes of not more than 1 μl from significantly larger quantities of dosing liquid supplies accommodated in the pipetting channel of several 10 s or even several 100 s of μl.

Since in preferred applications, the volume swept out by the piston surface of the pipetting piston in the pipetting channel in asynchronous, pulsed dispensing both in the motion section in the dispensing direction and in the motion section against the dispensing direction exceeds and in part even considerably exceeds the single volume dispended in asynchronous dispensing operation, and since further the asynchronous dispensing of dosing liquid from a pipetting channel does not like quasi-synchronous dispensing predominantly obeys the laws of fluid displacement by the pipetting piston but rather proceeds according to principles of momentum conservation and transfer, in asynchronous dispensing it is more difficult than in quasi-synchronous dispensing to determine the volume actually dispensed in a dispensing sequence or at least to determine whether the dosing liquid volume actually dispensed during an asynchronous dispensing sequence conforms or not within acceptable tolerance limits to the target total quantity planned for the dispensing sequence. This applies particularly to asynchronous aliquoting, in which a number of asynchronous single-volume dispensing runs proceed one after the other in a dispensing sequence.

SUMMARY OF THE INVENTION

It is, therefore, the task of the current invention to offer a technical solution which makes possible the determination of the dispensing quality of an asynchronous dispensing sequence with at least one asynchronous, pulsed single-volume dispensing process.

This task is solved in accordance with a device-based aspect by a pipetting device of the aforementioned type, in which additionally the control device is configured for determining, for a specified dosing liquid, a quality of a dispensing sequence which comprises at least one pulsed single-volume dispensing, on the basis of

- A target residual quantity value, which represents a target residual quantity of dosing liquid remaining in the pipetting channel at the end of the dispensing sequence,
- A working gas pressure after the end of the dispensing sequence, and
- An end position of the pipetting piston after the end of the dispensing sequence and outputting the determined quality discernibly.

The terms asynchronous and pulsed dispensing are used synonymously in this application.

It is pointed out expressly that in terms of the current application, knowledge of the target residual quantity of dosing liquid in the pipetting channel immediately after the end of the dispensing sequence and where relevant before the start of a further dispensing sequence, is equivalent to knowledge of the starting quantity immediately before the beginning of the dispensation sequence and of the target total quantity to be dispensed during the dispensation sequence.

This is because the target residual quantity corresponds to the starting quantity less the target total quantity. Therefore the control device can also determine the quality of the dispensing sequence on the basis of a starting quantity value, which represents a starting quantity of dosing liquid in the pipetting channel immediately before the beginning of the dispensing sequence, and a target dispensed quantity value, which represents the target total quantity of dosing liquid to be dispensed during the dispensing sequence, together with the working gas pressure and the end position of the pipetting piston.

The target residual quantity value in terms of this application can comprise more than only one number or value indication. For example, the target residual quantity value can comprise the said starting quantity value and the said target dispensed quantity value, which together, as explained above, represent the target residual quantity.

The starting quantity of dosing liquid in the pipetting channel is normally known. The starting quantity value representing it can be input manually via an input device or can be determined gravimetrically, for example by weighing a dosing liquid reservoir container before and after a transfer of the dosing liquid supply from the dosing liquid reservoir container into the pipetting channel of the pipetting device. Moreover, the starting quantity value can be known from an operating program of the pipetting device, for example because the pipetting device is configured for quasi-synchronous aspiration of a starting quantity of dosing liquid as a dosing liquid supply in the pipetting channel and without further malfunction messages the aspiration can be assessed or presumed to have been executed correctly.

The target dispensed quantity value is also normally known to the control device of the pipetting device, since the control device organizes and performs the operation of the pipetting device essentially in accordance with the target dispensed quantity value and/or in accordance with the target total quantity to be dispensed which is represented by the value. This value too can be input manually or transferred to the control device by a superordinate control unit or can be read by the control device from the data memory.

With a known starting quantity and equally known target total quantity to be dispensed, therefore, the target residual quantity of dosing liquid still present in the pipetting channel at the end of the dispensing sequence, and from it a working gas pressure in the pipetting channel assigned to the target residual quantity, can be determined and the latter adjusted by the control device through appropriate movement of the pipetting piston. Then, when the actual residual quantity of dosing liquid in the pipetting channel conforms sufficiently accurately to the target residual quantity, the end position of the pipetting piston after the end of the dispensing sequence and as appropriate before the beginning of a further dispensing sequence after adjustment of the working gas pressure assigned to the target residual quantity with sufficient conformity, i.e. within a predetermined tolerance range, will lie at a target end position of the pipetting piston assigned to the target residual quantity and/or to the assigned working gas pressure. Through comparison of the actual end position of the pipetting piston after adjustment of the working gas pressure assigned to the target residual quantity with the working gas pressure assigned to this target residual quantity and/or to the assigned working gas pressure, the control device can assess, from the difference between the actually reached end position of the pipetting piston and its assigned target end position, the quality of the dispensing sequence and produce an appropriate output.

The working gas pressure assigned to the target residual quantity can be a working gas pressure which is necessary in order to keep the target residual quantity motionless in the pipetting channel. Preferentially, the working gas pressure assigned to the target residual quantity is a working gas pressure which is necessary in order to keep the target residual quantity in a predetermined state, preferentially motionless, in the pipetting channel. The predetermined state in which the target residual quantity should be kept in the pipetting channel by exerting the working gas pressure assigned to the target residual quantity, can be a not more precisely determined, preferentially motionless, state of a liquid column with the target residual quantity in the pipetting channel. Preferentially, the predetermined state of the motionless target residual quantity is a "preconditioned state" referred to at the beginning, in which the meniscus located nearer to the pipetting aperture of the dosing liquid supply remaining in the pipetting channel is arranged in the pipetting channel at a predetermined distance to the pipetting aperture and/or exhibits an essentially flat shape. Working gas pressures which as regards the adjustment of the predetermined state are assigned to individual residual quantities, can be determined in advance experimentally in the laboratory and recorded as residual quantity-working gas pressure data correlation in the data memory. It is possible to record one residual quantity-working gas pressure data correlation for each of a number of different dosing liquids.

Likewise, the target piston position corresponding to a target residual quantity and/or to the working gas pressure assigned to the residual quantity can be determined in advance experimentally in the laboratory and recorded in a database derived appropriately from the experimental data. Such a data relation, which assigns a target piston position to a target residual quantity and/or a working gas pressure, can contain such assignment for a number of dispensed liquids and/or for a number of pipetting channel forms.

For example, a section of the pipetting channel containing the pipetting aperture can be formed by a pipetting tip connectable detachably to the rest of the pipetting channel. Since the piston position for generating a predetermined working gas pressure with a predetermined dosing liquid also depends on the shape of the pipetting tip, the data relation can also be created and recorded in the data memory for a number of pipetting tips.

The actual end position can be compared with the target end position only qualitatively or also quantitatively.

According to a method-based aspect of the current invention, the aforementioned task is solved by a method for determining the dosing quality of a dispensing sequence of a pipetting device working according to the air displacement principle, where the dispensing sequence comprises at least one pulsed single-volume dispensing run of a dosing liquid with a target single volume to be dispensed of less than 1 μl, which is delivered from the dosing liquid supply by generating an overpressure pulse of less than 50 ms pulse duration in a compressible working gas present between a pipetting piston and a dosing liquid supply in the pipetting channel of the pipetting device, where the method comprises the following steps:

- Determining a target residual quantity value which represents a target residual quantity of dosing liquid remaining in the pipetting channel at the end of the dispensing sequence,
- Determining a working gas pressure assigned to the represented target residual quantity, which is required in order to keep the target residual quantity in the pipetting channel in a predetermined state,
- Actuating a piston drive for adjusting the determined working gas pressure in the pipetting channel,
- After adjustment of the determined working gas pressure in the pipetting channel: Acquiring the piston position of the pipetting piston,
- Comparing the acquired piston position with a target piston position assigned to the represented target residual quantity and/or to the determined working gas pressure, and
- Producing an output representing the determined dosing quality as a function of the comparison result representing the dosing quality of the dispensing sequence.

Preferentially, the aforementioned pipetting device according to the invention is configured for performing the method according to the invention for determining the dosing quality. Further developments of the aforementioned pipetting device, therefore, are also further developments of the method for determining the dosing quality and vice versa.

The above applies to the predetermined state of the target residual quantity.

In an advantageous further embodiment of the invention, taking into consideration the above remarks, in a preferred embodiment the control device can be configured,

- Based on a starting quantity value, which represents a starting quantity of dosing liquid in the pipetting channel immediately before the beginning of the dispensing sequence, and a target dispensed quantity value which represents the target total quantity of dosing liquid to be dispensed during the dispensing sequence, to determine the target residual quantity value which represents the target residual quantity of dosing liquid remaining in the pipetting channel at the end of the dispensing sequence.

The control device can, in a concrete embodiment of the method according to the invention for determining a quality of a dispensing sequence, be configured,

- On the basis of a residual quantity-working gas pressure data correlation recorded in the data memory for the specified dosing liquid, to determine a working gas pressure assigned to the represented target residual quantity, and
- To actuate the piston drive for adjusting the determined working gas pressure in the pipetting channel, and
- After adjusting the determined working gas pressure in the pipetting channel, to acquire the position of the pipetting piston, and
- To compare the acquired piston position with a target piston position assigned to the represented target residual quantity and/or to the determined working gas pressure, and
- Depending on the comparison result representing the quality of the dispensing sequence, to produce an output representing the determined quality.

In principle, the starting quantity value can be any arbitrary value that represents unambiguously a starting quantity of dosing liquid in the pipetting channel before the beginning of the dispensing sequence. Thus, the starting quantity can be represented by an appropriate volume or mass value. Since, however, at the end of the dispensing sequence the expected target residual quantity is represented by a target piston position, preferentially the starting quantity value representing the starting quantity is also a starting position of the pipetting piston at the start of the dispensing sequence. Equally, the aforementioned target dispensed quantity value can be a difference value between two piston positions in the pipetting channel. Preferentially, the starting quantity value, target dispensed quantity value, and target residual quantity value are values in the same unit, such that they can be related to each other directly through arithmetical operations. It should, however, not be precluded that the mentioned values are values in different units and before forming a relationship through arithmetical operations are converted into values in the same unit.

Especially when the pipetting device is used for aliquoting of several single-volume dispensing runs of not more than 1 μl each, a dispensing error can add up with time and after an aliquoting dispensing sequence with several asynchronous single-volume dispensing runs easier to determine than after one sole single-volume dispensing run. Therefore, preferentially the control device is configured for determining the target dispensed quantity value on the basis of the number of single-volume dispensing runs of the dispensing sequence and of the dispensed target single volumes assigned to the single-volume dispensing runs.

As already remarked above, on the basis of an even more preferred embodiment of the current invention, control device can be configured to determine the target piston position on the basis of the starting quantity value and of the target dispensed quantity value. The difference between the starting quantity value and the target dispensed quantity value represents the target residual quantity of dosing liquid still remaining in the pipetting channel after the dispensing sequence and thus the target piston position.

The control device can, as already remarked above, be configured to determine the target piston position from a data relation recorded in the data memory for the relevant dosing liquid, in which for the dosing liquid a target piston position is assigned to each of a number of represented target residual quantities.

At this point it is expressly made clear that the dispensing sequence can comprise just one single asynchronous single-volume dispensing run or a number of asynchronous single-volume dispensing runs.

In principle, the discernible indication of the determined quality induced by the control device can be any discernible output. To this end, the pipetting device need not even exhibit a visual or acoustic indication device, although this is preferred for the output of information about the quality. For example, the control device can be configured to actuate into motion a movable component of the pipetting device that can be actuated by the control device into motion as a discernible indication of the determined quality. Thus, for example, the control device can actuate a movable component of the pipetting device that can be actuated into motion in a way that is unusual for normal operation, in order to indicate to the operating personnel working with the pipetting device that the quality of a monitored dispensing sequence is in order or not in order. For example, to this end the control device can actuate the pipetting piston as a function of the determined result into motion in a specified movement pattern or movement path.

Preferentially however it is provided that the pipetting device exhibits an output device for visual and/or acoustic and/or haptic information output and the control device is configured to actuate the output device to output visual and/or acoustic and/or haptic information as a discernible indication. The output device is preferentially a display screen, but can also be just a warning light that is switched on or operated to flash. Likewise the pipetting device can exhibit a loudspeaker as an acoustic output device, which depending on the determined quality can output different sounds and/or which is configured for voice output, where appropriate synthetic voice output. Thus, predefined texts can be recorded in the data memory, which the control device selects depending on the determined quality and outputs acoustically audibly via the output device. For the output of haptic information, surfaces or user input devices, such as e.g. joysticks, can be set by the control device in vibration or a similar tactile motion.

Even though in principle it can suffice for the control device to out whether a previous dispensing sequence lies with regard to its quality, i.e. especially with regard to its dispensing accuracy, within a specified tolerance range, it is advantageous to output to the operating personnel working with the pipetting device detailed data about the determined quality of the investigated dispensing process. To this end, in accordance with an advantageous further development of the current invention the control device can be configured, when the comparison of the acquired piston position with the target piston position yields that the acquired piston position lies quantitatively by more than a specified first tolerance interval nearer to a pipetting aperture through which dosing liquid is dispensed from the pipetting channel than the target piston position, to produce a discernible output of information that represents the dispensing of a larger dosing liquid quantity than the target total quantity, and/or when the comparison of the acquired piston position with the target piston position yields that the acquired piston position lies quantitatively by more than a specified second tolerance interval further away from the pipetting aperture than the target piston position, to produce a discernible output of information that represents the dispensing of a smaller dosing liquid quantity than the target total quantity, and/or when the comparison of the acquired piston position with the target piston position yields that the acquired piston position conforms to the target piston position within a specified tolerance band, to produce a discernible output of information that represents the dispensing of a dosing liquid quantity that conforms sufficiently to the target total quantity.

The first and the second tolerance interval can be quantitatively different in size or of the same size.

In principle, the pipetting device is preferentially configured not only for asynchronous dispensing, but also for quasi-synchronous dispensing of dosing liquid, in particular of dispensed quantities of more than 1 μl. Regardless, however, of whether the pipetting device is actually also operated to dispense quasi-synchronously, the pipetting device can preferentially admit the dosing liquid supply, out of which the small single volumes with not more than 1 μl are dispensed asynchronously, into the pipetting channel through quasi-synchronous aspiration. In quasi-synchronous aspiration, the dosing liquid supply is introduced into the pipetting channel through the pipetting aperture from a dosing liquid reservoir provided outside the pipetting channel, by means of motion in the aspiration direction that increases the volume of the working gas. The pipetting device, therefore, is configured preferentially for quasi-synchronous aspiration of dosing liquid into the pipetting channel. It should, however, not be precluded that the dosing liquid supply provided in the pipetting channel for asynchronous dispensing of small single volumes is introduced into the pipetting channel through an appropriate feed line, although the aspiration of dosing liquid is preferable.

Preferentially the pipetting device is configured, in addition to asynchronous dispensing, also for quasi-synchronous dispensing of dosing liquid in single dispensed volumes of more than 1 μl, preferentially of more than 5 μl.

Since asynchronous dispensing makes possible the dispensing of small single volumes from a dosing liquid supply in the pipetting channel that is large compared with the single volumes, the dispensing sequence comprises more than ten, preferentially more than 20 or especially preferentially even more than 30 asynchronous single-volume dispensing runs. Thus, consequently, a dosing liquid supply can be taken up in one aspiration working cycle and delivered in more than ten, more than 20, or even more than 30 asynchronous single-volume dispensing runs.

In order that the pipetting device should be as comprehensively as possible ready for use in a laboratory environment without costly setting-up times, preferentially at least one residual quantity-working gas pressure data correlation is recorded in the data memory for each of a large number of dosing liquids.

For the same reason, it is preferentially provided that at least one residual quantity-piston position data relation is recorded in the data memory for each of a large number of dosing liquids, in which a target piston position is assigned to each of a number of represented target residual quantities.

The individual dosing liquids can be characterized by at least one substance variable relevant for distinguishing between them, such as e.g. density and/or viscosity. Therefore, preferentially at least one characteristic substance value, such as density, viscosity, and the like is recorded in the data memory for a large number of dosing liquids.

The at least one characteristic substance variable, especially the density, can be recorded as a function of the temperature of the dosing liquid, since numerous substance values of dosing liquids vary quantitatively as a function of their temperature. Likewise, the data relations and/or data correlations can be recorded in the data memory for different temperatures of the dosing liquid and/or of the pipetting device, in order to be able to take into account a temperature variability of the dosing liquid and/or of the working gas. For temperature compensation of the quality determination, therefore, in accordance with a preferred further development the pipetting device can exhibit a temperature sensor, which acquires the temperature of the working gas and/or of a dosing liquid quantity accommodated in the pipetting channel and/or of a section of the pipetting channel and transmits to the control device.

The aforementioned data relations and/or data correlations can be recorded in the data memory in various forms. This can be an analytical function, which calculates a value as a function of another value, or a database or a data correlation can be recorded as a characteristic diagram with several interpolation points, where values to be read from the characteristic diagram which lie between the stored interpolation points can be determined by interpolation. For temperature compensation, either multidimensional characteristic diagrams or analytical functions with at least two variables can be recorded as a data relation and/or data correlation.

Since the current invention can be realized through appropriate programming of a control device of a pipetting device, the task referred to at the beginning is also solved by a computer program product and/or software on a data medium, comprising a sequence of operating instructions executable by an electronic data processing and/or computing unit, which executed on the electronic computing unit, which is linked with a pipetting device working according to the air displacement principle, especially to a pipetting device as described above and further developed, so as to allow signal transmission, effects the execution of the method as described above and further developed. The electronic computing unit is here preferentially the aforementioned control device of the pipetting device. The data medium can also be a server, from which the software and/or the computer program product is downloadable via a data link, such as e.g. the Internet.

The piston drive is preferentially a linear motor piston drive, whose rotor is the pipetting piston itself. The pipetting piston exhibits to this end at least one, preferentially however a number of permanent magnets. The stator of the piston drive comprises a number of electrically current-carrying coils radially outside the pipetting channel, whose current is controllable by the control device. By means of a linear motor piston drive, the high movement magnitudes of the pipetting piston can be achieved that are needed for pulsed, asynchronous dispensing. Thus the control device, for pipetting a predetermined single-dosing volume of less than 1 μl, can be configured to move the pipetting piston with a peak velocity of at least 5000 μl/s, preferentially of at least 10000 μl/s, and of no more than 25000 μl/s. Quoting the peak velocity in μl/s takes into consideration the piston surface of the pipetting piston to be moved. Pipetting pistons with a larger piston surface can be moved more slowly for pulsed dispensing of one and the same single-dosing volume than pistons with a smaller piston surface. The current invention concerns preferentially pipetting devices whose pistons exhibit a piston surface of between 3 and 80 $mm^2$, that is to say those that with a circular piston surface exhibit a diameter of between 2 and approximately 10 mm.

The control device is configured to accelerate and/or decelerate the pipetting piston with an acceleration of at least $2\times10^6$ $\mu l/s^2$, preferentially of at least $6\times10^6$ $\mu l/s^2$ especially preferentially even of at least $8\times10^6$ $\mu l/s^2$ and of no more than $5\times10^7$ $\mu l/s^2$ to move along the channel path. The details stated above regarding the preferred piston size, quoted as piston surface, apply.

If the meniscus located nearer to the pipetting aperture is to be arranged at a distance from the pipetting aperture before the beginning of a dispensing sequence, a gas volume between the pipetting aperture and the delivering meniscus is preferentially equal to at least approximately two to four times the pulsed dosing liquid volume to be dispensed. On the other hand, the gas volume should as far as possible be not larger than 25 times, preferentially not larger than 20 times the single dosing liquid volume envisaged for pulsed dispensing.

The following applies: the larger the volume of the working gas between the pipetting piston and the dosing liquid supply accommodated in the pipetting piston, the greater the ratio of the volume swept out by the pipetting piston in asynchronous dispensing during its movement portion in the dispensing direction to the relevant single-dosing volume. With the preferred exchangeable pipetting tips, usually due to the construction the working gas volume between the pipetting piston and the dosed volume cannot be below 100 μl and cannot exceed 3000 μl. Preferentially, the working gas volume lies between 180 μl and 1000 μl, especially preferentially between 200 μl and 800 μl.

BRIEF DESCRIPTION OF THE DRAWING FIGURES

Figure 2:
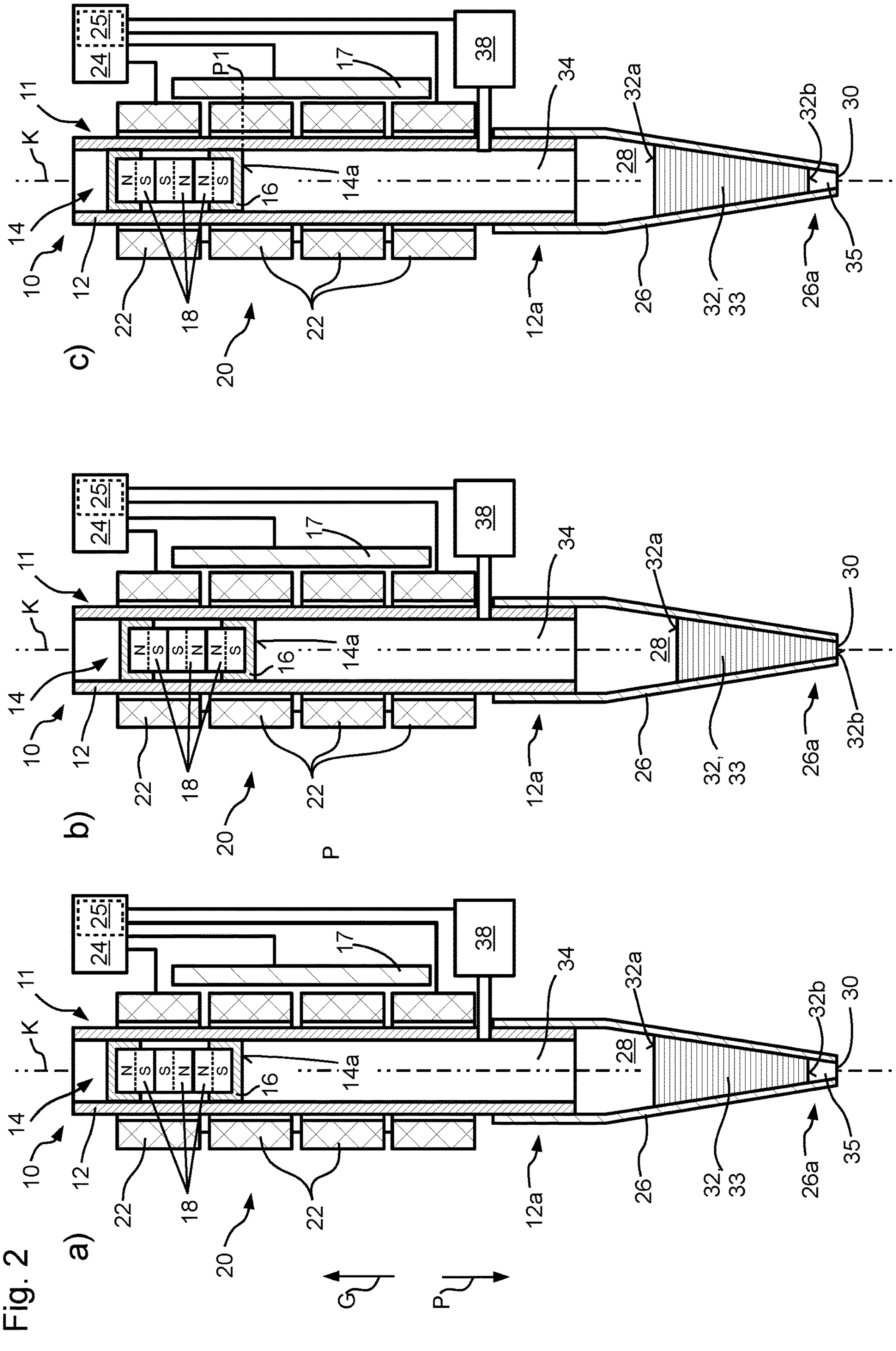
Figure 3:
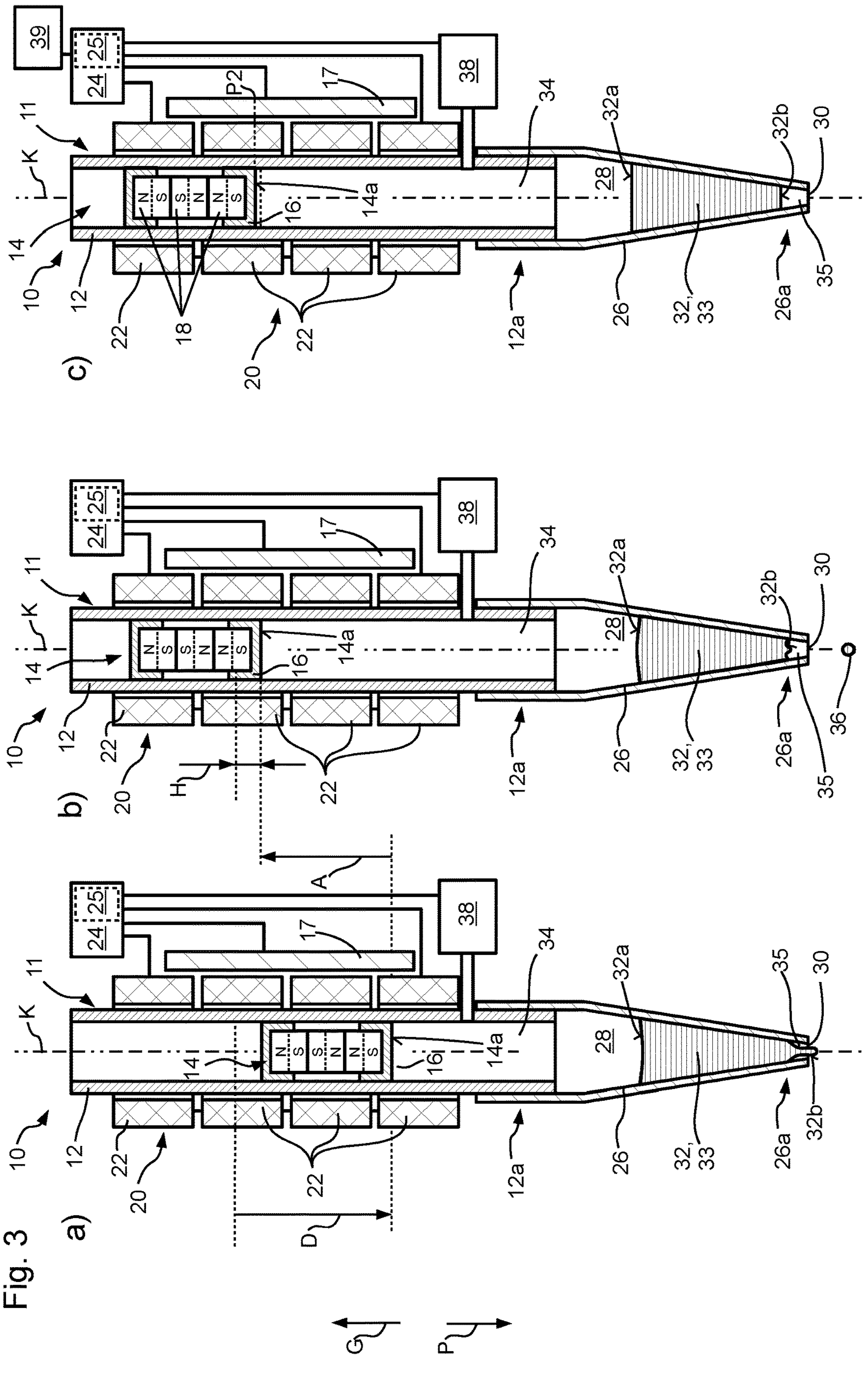
Figure 4:
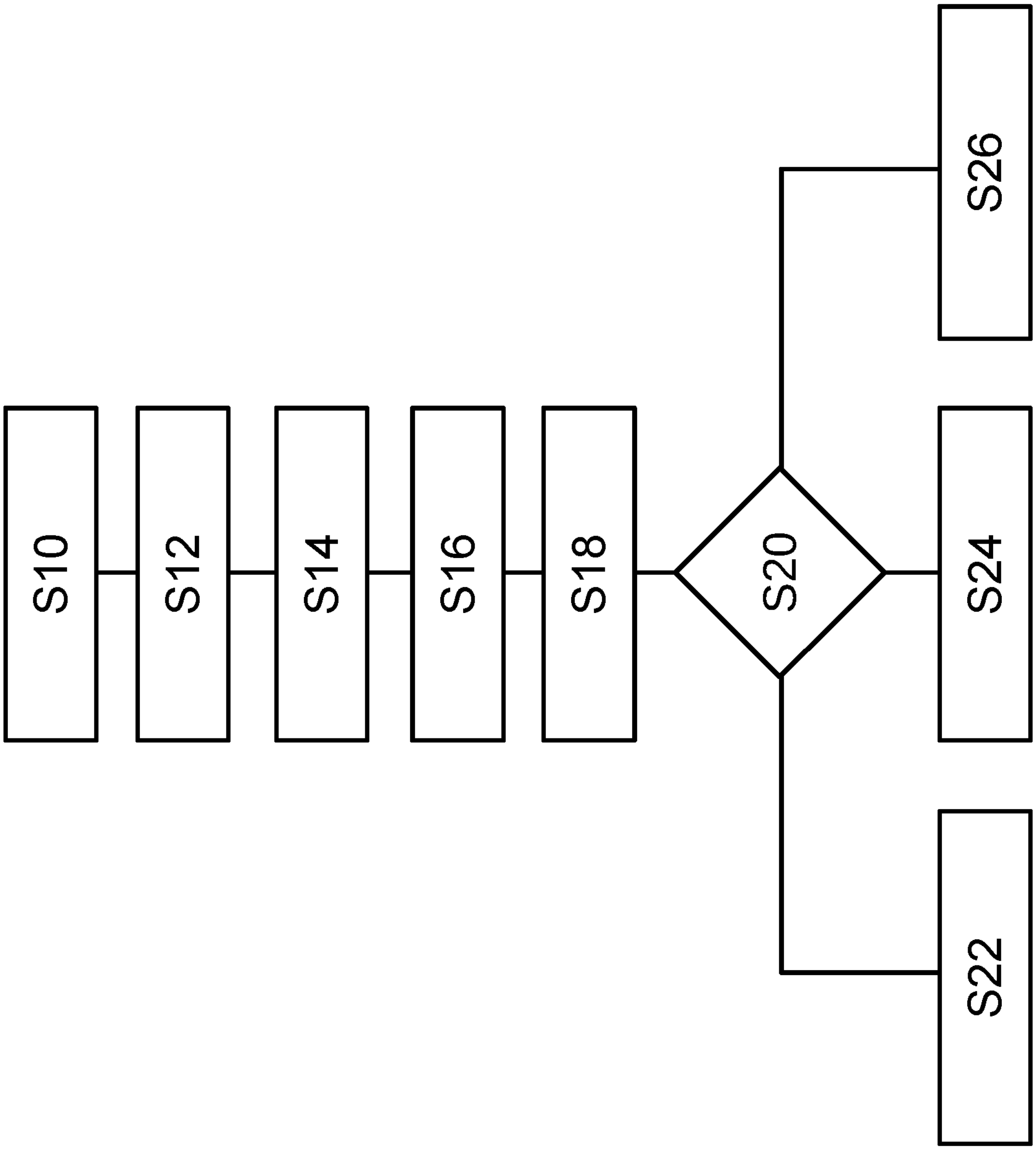

The current application is explained in further detail below by reference to the enclosed drawings. The figures show:

FIG. 1 A pipetting device according to the invention, in which a pulsed dispensing method according to the invention is executed, immediately after the quasi-synchronous aspiration of a predetermined quantity of dosing liquid, FIG. 2*a* The pipetting device of FIG. 1 after generating a first underpressure in the working gas referred to the holding pressure of FIG. 1, for creating a gas volume between the pipetting aperture and the aspirated dosing liquid, FIG. 2*b* The pipetting device of FIG. 2*a* after increase of the pressure of the working gas between pipetting piston and aspirated dosing liquid, for displacing the meniscus located nearer to the pipetting aperture towards the pipetting aperture, FIG. 2*c* The pipetting device of FIG. 2*b* after generating a second underpressure in the working gas referred to the holding pressure of FIG. 1, for creating a gas volume between the pipetting aperture and the aspirated dosing liquid and a meniscus located nearer to the pipetting aperture with a defined shape, FIG. 3*a* The pipetting device of FIG. 2*c* during the abrupt generation of an overpressure pulse with the pipetting piston at the lower dead point of its whip-like motion for pulsed dispensing, FIG. 3*b* The pipetting device of FIG. 3*a* after completion of the whip-like piston motion for dispensing a single dosed volume of 0.50 μl, FIG. 3*c* The pipetting device of FIG. 3*b* with working gas pressure adjusted in the working gas through appropriate piston motion in accordance with the expected target residual quantity of dosing liquid for pre-conditioning of the dosing liquid supply in the pipetting channel for subsequent asynchronous single-volume dispensing, FIG. 4 A rough schematic flowchart of a method according to the invention for determining the quality of the dispensing sequence of FIGS. 3*a* and 3*b*.

DETAILED DESCRIPTION OF THE PREFERRED EMBODIMENTS

In FIGS. 1 to 3*c*, a pipetting device according to the invention is generally denoted by 10. This comprises a pipetting channel 11 with a cylinder 12, which extends along a channel path K configured as a straight channel axis. In this pipetting channel 11, a pipetting piston or in brief “piston” 14 is accommodated movably along the channel path K.

The piston 14 comprises two end caps 16 (for clarity, only the lower one is labeled with a reference number in FIGS. 1 to 3*c*), between which a number of permanent magnets 18 (in the current example, three permanent magnets 18) are accommodated. In order to achieve along the channel path K a sharply separated magnetic field, the permanent magnets 18 are polarized along the channel axis K and arranged pairwise with same-named poles pointing towards each other. This arrangement results in a magnetic field emanating from piston 14, which as far as possible is uniform around the channel axis K, i.e. essentially rotation-symmetrical with regard to the channel axis K, and which along the channel axis K exhibits a high gradient of the magnetic field strength, such that opposite-named polarization zones interchange alternatingly with sharp separation along the channel path K. Thereby, for example by means of a Hall sensor arrangement as a position sensor 17, a high positional resolution can be achieved in the position acquisition of the piston 14 along the channel axis K and very efficient coupling of an external magnetic field to the piston 14 can be achieved.

The end caps 16 are formed preferentially of a low-friction, graphite-comprising material, as is known for example from commercially available caps of Airpot Corporation in Norwalk, Connecticut, (USA). In order to be able to exploit the low friction provided by this material as fully as possible, the pipetting channel 11 comprises preferentially a glass cylinder 12, such that during movement of the piston 14 along the channel axis K the graphite-comprising material slides with extremely low friction along a glass surface.

The piston 14 thus forms a rotor of a linear motor 20, whose stator is formed by the coils 22 surrounding the pipetting channel 11 (here only four coils are shown as an example).

It is pointed out expressly that FIGS. 1 to 3*c* show merely a rough schematic longitudinal cross-section of a pipetting device 10 according to the invention, which should by no means be understood as being to scale. Furthermore, plural components are depicted by an arbitrary number of components, such as for example three permanent magnets 18 and four coils 22. In actual fact, both the number of permanent magnets 18 and the number of coils 22 can be greater or indeed smaller than the number shown.

The linear motor 20, more precisely its coils 22, are actuated via a control device 24 that is linked with the coils 22 so as to allow signal transmission. A signal can also be the transmission of electric current for sending current through the coils and thus for generating a magnetic field through these.

At the dosing-side end 12*a* of the cylinder 12, a pipetting tip 26 is installed detachably in a manner which in principle is known. The connection of the pipetting tip 26 with the dosing-side longitudinal end 12*a* of the cylinder 12 is likewise shown only in rough schematic form.

The pipetting tip 26 defines a pipetting space 28 in it interior, which at the coupling-distal longitudinal end 26*a* is accessible solely through a pipetting aperture 30. The pipetting tip 26 extends the pipetting channel 11 during its coupling to the cylinder 12 up to the pipetting aperture 30 and is part of the pipetting channel 11.

In the example shown in FIG. 1 of the pipetting device 10 immediately after completion of a conventional, quasi-synchronous aspiration process by the pipetting device 10, a quantity and/or a supply 32 of dosing liquid 33 is accommodated in the pipetting space 28 and thus in the pipetting device 10.

Between the piston 14 and the dosing liquid supply 32 there is located permanently working gas 34, which serves as a force mediator between the piston 14 and the dosing liquid supply 32. Preferentially there is located between the piston 14 and the dosing liquid supply 32 only the working gas 34, possibly modified negligibly in its chemical composition due to taking up volatile constituents from the dosing liquid 33.

Even with a completely emptied pipetting tip 26, the working gas 34 is arranged between the piston 14 and a dosing liquid 33, since the pipetting tip 26 is immersed in an appropriate dosing liquid reservoir for the aspiration of dosing liquid 33, such that in this state a meniscus of the dosing liquid 33 is present at least at the pipetting aperture 30. Thus, in every state of the pipetting device 10 that is relevant for a pipetting process, working gas 34 is located permanently and completely between the piston 14 and a dosing liquid 33 and separates them from each other.

More precisely, the working gas 34 is located between a dosing-side end face 14*a* of the piston 14, which in this example is formed by an end face of the end cap 16 pointing in the axial direction—relative to the channel path K—towards the pipetting aperture 30 and a meniscus 32*a* located further away from the pipetting aperture of the dosing liquid supply 32 accommodated in the pipetting space 28 as a liquid column.

For the sake of clarity, only FIG. 1 shows a temperature sensor 19 connected with the control device 24 so as to allow signal transmission, which acquires the temperature of the working gas 34 and transmits it to the control device 24. This makes possible temperature compensation of all the temperature-dependent data recorded in the data memory 25 and of all the acquisition results of further sensors.

Proceeding from the state shown in FIG. 1, preparation for a pulsed dispensing process of the pipetting device 10 according to the invention and the pulsed dispensing process itself are described below:

With reference to FIGS. 2*a* to 2*c*, preparation of the pipetting device 10 and preconditioning of the dosing liquid supply 32 are described, with which the accuracy of the pulsed dispensing process shown in FIGS. 3*a* and 3*b* can be improved considerably. This means essentially that smaller minimum dispensed doses with higher repetition accuracy can be delivered than without the appropriate preparation.

Immediately after aspiration of the predetermined quantity of dosing liquid supply 32 into the pipetting tip 26, the meniscus 32*a* located further away from the pipetting aperture of the dosing liquid supply 32 motionless in the pipetting space 28 and thus in the pipetting channel 11 exhibits a concave shape due primarily to gravity. Likewise, a meniscus 32*b* located nearer to the pipetting aperture exhibits a convex shape due primarily to gravity.

Proceeding from the state of the pipetting device 10 immediately after aspiration of the predetermined quantity of dosing liquid supply 32 into the pipetting tip 26 (s. FIG. 1), the control device 24 sends current into the coils 22 in such a way that the pipetting piston 14 is moved in the sense of generating a (first) underpressure in the working gas 34, i.e. in a direction G away from the pipetting aperture 30 against the dispensing direction P.

As a result, the dosing liquid supply 32 provided in the pipetting channel 11, more precisely inside the pipetting space 28 of the pipetting tip 26, is displaced along the channel axis K away from the pipetting aperture 30 into the pipetting channel 11, more precisely into the pipetting tip 26. The dosing liquid supply 32 provided in the pipetting channel 11 is confined in the direction towards the pipetting piston 14 by the meniscus 32*a* located further away from the pipetting aperture 30 and is confined in the direction towards the pipetting aperture 30 by the meniscus 32*b* located nearer to the pipetting aperture. Due to the displacement of the dosing liquid supply 32 away from the pipetting aperture 30, a gas volume 35 forms between the pipetting aperture 30 and the meniscus 32*b* located nearer to the pipetting aperture.

In the case, for example, of a taken-up quantity of dosing liquid supply 32 of 40 μl, the gas volume 35 immediately before triggering of the pulsed dispensing overpressure pulse equals preferentially 4 to 10 μl, especially preferentially 4 to 6 μl.

Due to the displacement away from the pipetting aperture 30 of the meniscus 32*b* located nearer to the pipetting aperture and therefore later releasing the dosed droplet, the meniscus 32*b* present at the pipetting aperture 30 after the aspiration with an undefined shape, in particular undefined convex curvature, obtains a more strongly defined shape. After creation of the gas volume 35 as per FIG. 2*a*, the shape of the meniscus 32*b* located nearer to the pipetting aperture is essentially flat.

To this end, a data memory 25 linked with the control device 24 so as to allow data transmission stores a previously experimentally determined dosing liquid quantity-working gas pressure data correlation, in which a working gas pressure is assigned to the quantity 32 of dosing liquid 33 accommodated or present in the pipetting channel 11, whose adjustment as pressure of the working gas 34 effects an essentially flat meniscus 32*b* located nearer to the pipetting aperture. The dosing liquid quantity-working gas pressure data correlation is the residual quantity-working gas pressure data correlation mentioned in the introduction to the description.

The pipetting device exhibits a pressure sensor 38 which acquires the pressure of the working gas 34 in the pipetting channel 11 and transmits it via a signal or data link to the control device 24. The control device 24, to which the just now aspirated starting quantity of dosing liquid 33 is known due to the aspiration operation controlled by it, reads out in the data memory 25 from the dosing liquid quantity-working gas pressure data correlation the working gas pressure assigned to the starting quantity as a target working gas pressure or computes it, by interpolation if necessary, and moves the piston 14 in accordance with the signal supplied by the pressure sensor 38 in such a way that the pressure of the working gas 34 equals the target working gas pressure.

The shape of the meniscus 32*b* located nearer to the pipetting aperture depends, for example, on the the surface tension of the dosing liquid 33, on its density, on its viscosity, and on the wettability of the walls of the pipetting tip 26 by the dosing liquid 33.

In accordance with FIG. 2*b*, the control device 24 can subsequently drive the coils 22 to move the pipetting piston 14 in terms of a pressure elevation in the working gas 34, i.e. displace the pipetting piston 14 in the dispensing direction P towards the pipetting aperture 30. Thereby, the dosing liquid 32 provided in the pipetting tip 26 is displaced back again in the direction towards the pipetting aperture 30, but not beyond it. The gas volume 35 between the pipetting aperture 30 and the meniscus 32*b* located nearer to the pipetting aperture becomes thereby smaller or even vanishes completely.

Further, the control device 24 can once again impel the coils 22 to move the pipetting piston 14 in terms of decreasing the pressure of the working gas 34, i.e. in the direction G away from the pipetting aperture 30, whereby once again a gas volume 35 is formed and/or enlarged between the pipetting aperture 30 and the meniscus 32*b* located nearer to the pipetting aperture of the dosing liquid 32. Again the control device 24 adjusts in the working gas 34 the previously determined target working gas pressure. Through the back-and-forth motion of the dosing liquid 32 in the pipetting tip 26, as shown in FIGS. 2*a* to 2*c*, for the same dosing liquid 33 the same shape, preferentially essentially flat, of meniscus 32*b* located nearer to the pipetting aperture is always formed at the end of the generation of the second underpressure as per FIG. 2*c*, which is advantageous for the subsequent pulsed dispensing process, as shown and described in FIGS. 3*a* and 3*b*. The advantage consists in the decrease of the minimum dispensable liquid quantity and in the achievable repeatability of same when aliquoting.

The central point of the inventive idea of the current application is a whip-like motion of the piston 14. This whip-like motion is manifested in several kinds of configurations.

Due to the provided preferred linear motor 20, the piston 14 can be moved with enormous motion dynamics along the channel axis K. For dispensing a small quantity of liquid, about 0.5 μl of the dosing liquid 33, the piston 14 is first moved rapidly in the sense of generating a pressure elevation in the working gas 34 (here: dispensing direction P) towards the pipetting aperture 30. The control device 24 actuates the coils 22 of the linear motor 20 in such a way that the piston 14 executes such a large stroke D that the dosing-side end face 14*a* of the piston 14 sweeps out along the stroke D a multiple, about 40 times, of the predetermined single-dosing volume 36 (see FIG. 3*b*). The piston 14 is then located in the position shown in FIG. 3*a* at the lower dead point of its motion in the dispensing direction P, whereupon the piston 14 is impelled to an opposite motion in the aspiration direction G, i.e. in the sense of decreasing the pressure of the working gas 34.

The motion of the piston 14 in the dispensing direction P lasts less than 10 ms. When the piston 14 reaches its lower dead point, no part of the dosing liquid supply 32 has yet detached itself from the pipetting tip 26. The meniscus 32*b* located nearer to the pipetting aperture is shown in a shape preparatory to droplet release. The shape of the meniscus 32*b* is chosen only for illustration purposes, in order to visualize that a release of a dosing liquid droplet 36 (s. FIG. 3*b*) is imminent. The meniscus 32*a* located further away from the pipetting aperture is shown concavely curved, in order to show the effect of the overpressure pulse on the dosing liquid supply 32.

The piston is moved in the dispensing direction at a maximum velocity of about 10,000 μl/s and to that end accelerated with an acceleration of up to $8\times10^6$ μl/$s^2$ and slowed down again. The maximum velocity, however, occurs only briefly. This means that the piston 14, in the aforementioned case in which its dosing-side end face 14*a* sweeps out in the course of the dispensing motion a volume of about 40 times the single-dosing volume 36, i.e. about 20 μl, requires about 6 to 8 ms for this dispensing motion.

The dosing liquid supply 32 is too inert to follow this piston motion. Instead, a pressure-elevating pulse is transmitted from the piston 14 via the working gas 34 to the dosing liquid supply 32 in the pipetting tip 26. Proceeding from the picture shown in FIG. 3*a*, the piston 14 is now accelerated as immediately as possible back in the aspiration direction G, where in the current case the movement stroke A in the aspiration direction is smaller than the stroke D of the movement in the dispensing direction to the extent that during the course of the movement in the aspiration direction A the end-side piston surface 14*a* sweeps out a volume referred to as "aspiration volume" which is smaller by the single-dosing volume 36 than the volume swept out during the piston's motion in the dispensing direction P, referred to hereunder as "dispensing volume".

Having said that, this does not have to be thus. The aspiration volume can also be exactly as large as the dispensing volume. An aspiration volume reduced by the single-dosing volume 36, however, has the advantage that the position of the meniscus located nearer to the pipetting aperture does not change after the pipetting, which is advantageous especially in the aliquoting operation.

In the end position shown in FIG. 3*b* of the pipetting device 10 after the end of the pulsed dispensing process, the dosing-side end face 14*a* is distant by a resulting stroke H from the starting position of FIG. 2*c*, where in the pictured example the piston surface of the piston 14 multiplied by the resulting stroke H equals the single-dosing volume 36. For improved recognizability, the depiction of the stroke H in the drawing is not to scale and exaggerated.

The motion in the aspiration direction too, proceeds at the quoted maximum velocity, such that this motion also requires about 6 to 8 ms. With additional dwell times at the lower dead point, which can arise through overcoming the static friction limit, and taking into account any motion overshoots of the piston 14 about its rest position that may occur, the entire piston motion up to reaching the end position, as shown in FIG. 3*b*, takes place in about 14 to 30 ms.

Only after the reversal of the piston's motion from the aspiration direction to the dispensing direction is a defined single-dosing volume 36 in the form of a droplet ejected away from the pipetting aperture 30. This droplet moves along the notionally extended channel path K to a dosing destination placed under the pipetting aperture 30, for instance a container or a well. After ejecting the dosing liquid droplet 36, the meniscus 32*b* located nearer to the pipetting aperture can still overshoot briefly.

The pipetting tip 26 can exhibit a nominal pipetting space volume that significantly exceeds the single-dosing volume, about 200-400 μl, preferentially 300 μl.

The motion of the piston 14 in the aspiration direction, in turn, proceeds so rapidly that a pressure-decreasing pulse is transmitted from the dosing-side end face 14*a* to the dosing liquid supply 32 in the pipetting space 28.

The pressure-elevating pulse of the piston's motion in the dispensing direction forms the steep rising flank of an overpressure pulse, whose steep falling flank forms the pressure-decreasing pulse of the piston's motion in the aspiration direction. The temporally shorter the individual piston motion, the steeper the flank of the pressure-modifying pulse assigned to it. Thus, the two pressure-modifying pulses acting in opposite senses can define a "hard" overpressure pulse with steep flanks.

The impinging of the thus formed "hard" overpressure pulse on the meniscus 32*a* located further away from the pipetting aperture of the dosing liquid supply 32 leads to the extremely precise repeatable dispensing result.

Surprisingly, the here presented dispensing process is independent of the size of the chosen pipetting tip 26. The same piston motion described above would lead to exactly the same result even with a considerably smaller pipetting tip of, for instance, a nominal pipetting space volume of 50 μl, provided that the same working gas and the same dosing liquid continue to be used with unchanged dispensing parameters.

Thus the current pipetting device according to the invention and the presented pulsed dispensing method according to the invention are outstandingly suitable for the aliquoting of liquids from even large supplies 32 of dosing liquid 33 accommodated in pipetting tips 26. Even over many aliquoting cycles, the dispensing behavior of the pipetting device 10 does not change under otherwise the same conditions. The dispensing behavior of the pipetting device 10 according to the invention is therefore also independent of the filling ratio of a pipetting tip 26 coupled to the cylinder 12, as long as it is sufficiently filled for pulsed dispensing.

Due to inertia, the piston's motion may possibly not follow completely exactly the control signal motivating the motion. At points of large dynamic forces—namely at the reversal of the direction of motion from the dispensing direction to the aspiration direction, but also when the piston stops—the piston can tend to overshoot. In the event of doubt, therefore, what should be decisive are the control signals motivating the motion, which are the mapping of a target movement.

FIG. 3*c* shows the pipetting device during assessment of the quality of the previously described asynchronous dispensing sequence, which comprises only one asynchronous single-volume dispensing run but which can also comprise several single-volume dispensing runs, as they occur in aliquoting. FIG. 4 shows the sequence of the quality determination.

In Step S10, the control device 24 determines by difference formation, from the known starting quantity of dosing liquid 33 in the pipetting channel 11 and from the target total quantity to be dosed in the previous dosing sequence of FIGS. 3*a* and 3*b*, the target residual quantity of dosing liquid 33 remaining in the pipetting channel after the dispensing sequence in FIG. 3*c*.

In the following Step S12, the control device 24 reads out in the data memory 25 from the dosing liquid quantity-working gas pressure data correlation or residual quantity-working gas pressure data correlation recorded there, a working gas pressure assigned to the target residual quantity determined in Step S10.

In Step S14, the control device 24 actuates the piston 14, taking into account the signal of the pressure sensor 38, to move in such a way that in the working gas 34 the working gas pressure read out in Step S12 and assigned to the target residual quantity prevails. The dosing liquid supply 32 remaining in the pipetting channel 11 is then again, under the assumption that it conforms sufficiently accurately to the target residual quantity, in a dispensing-ready "preconfigured" state with appropriate distance of the meniscus 32*b* located nearer to the pipetting aperture from the pipetting aperture 30 and with an essentially flat shape of the meniscus 32*b*.

In Step S16, the control device 24 reads out in the data memory 25 from a target residual quantity-target piston position data relation recorded there, in which for the dosing liquid 33 a target piston position is assigned to each of a number of target residual quantities, the target piston position assigned to the target residual quantity determined in Step S10. The target piston position can be quoted as a piston position difference value, and determined by the control device 24 through difference formation based on the piston position P1 acquired by the position sensor 17 and stored (s. FIG. 2*c*) for the preconditioned starting quantity of dosing liquid supply 32 immediately before the dispensing sequence.

In Step S18, the position sensor 17 acquires the current piston position P2 (s. FIG. 3*c*) after adjustment of the assigned working gas pressure and transfers it to the control device 24.

In Step S20, the control device 24 compares the piston position P2 acquired in Step S18 with the target piston position determined in Step S16.

Proceeding from the comparison performed in Step S20, in Step S22 the control device 24 sends to the output unit 39 (shown only in FIG. 3*c*), when the piston position P2 is further away from the pipetting aperture 30 than the target piston position determined in Step S16 by more than a permissible tolerance value, a message that the actually dispensed dosing liquid quantity 36 was impermissibly smaller than the target dispensed quantity.

Proceeding from the comparison performed in Step S20, in Step S24 the control device 24 sends to the output unit 39 (shown only in FIG. 3*c*), when the piston position P2 corresponds to the target piston position determined in Step S16 within a predetermined tolerance band, a message that the actually dispensed dosing liquid quantity 36 conforms sufficiently to the target dispensed quantity.

Proceeding from the comparison performed in Step S20, in Step S26 the control device 24 sends to the output unit 39 (shown only in FIG. 3*c*), when the piston position P2 is nearer to the pipetting aperture 30 than the target piston position determined in Step S16 by more than a permissible tolerance value, a message that the actually dispensed dosing liquid quantity 36 was impermissibly larger than the target dispensed quantity.

All particulars relating to the embodiment example refer to operation of the pipetting device 10 in an atmosphere of air at 20° C. and a pressure of 1013 hPa.

The invention claimed is:

1. A pipetting device, comprising:
- a pipetting channel extending along a channel path and filled at least in part with a compressible working gas,
- a pipetting piston accommodated movably in the pipetting channel along the channel path,
- a piston drive, configured for impelling the pipetting piston to move along the channel path in order to modify the pressure of the working gas in the pipetting channel by means of piston motion,
- a control device, configured for actuating the piston drive,
- a data memory linked with the control device so as to allow signal transmission,
- a pressure sensor that acquires the pressure of the working gas and that is linked with the control device so as to allow signal transmission,
- a piston position sensor that acquires a position of the pipetting piston and that is linked with the control device so as to allow signal transmission,
- where the control device is configured for impelling the pipetting piston to a pulsed dispensing motion for single-volume dispensing of a single volume of not more than 1 μl, where through the dispensing motion for single-volume dispensing, which dispensing motion for each single-volume dispensing comprises two motion sections in opposite directions along the channel path, an overpressure pulse is generated in the working gas for a duration not exceeding 50 ms,
- wherein the control device is configured to determine for a specified dosing liquid a quality of a dispensing sequence, which comprises at least one pulsed single-volume dispensing run, on the basis of
- a target residual quantity value, which represents a target residual quantity of dosing liquid remaining in the pipetting channel at the end of the dispensing sequence,
- a working gas pressure after the end of the dispensing sequence, and
- an end position of the pipetting piston after the end of the dispensing sequence and to output the determined quality discernibly.

2. The pipetting device according to claim 1,
- wherein the control device is at least one of:
- configured to determine, in accordance with a starting quantity value which represents a starting quantity of dosing liquid in the pipetting channel before the beginning of the dispensing sequence, and a target dispensed quantity value which represents the target total quantity of dosing liquid to be dispensed during the dispensing sequence, a target residual quantity value which represents a target residual quantity of dosing liquid remaining in the pipetting channel at the end of the dispensing sequence; and configured to:

determine, on the basis of a residual quantity working gas pressure-data correlation recorded in the data memory for the specified dosing liquid, a working gas pressure associated to the represented target residual quantity, and actuate the piston drive to adjust the determined working gas pressure in the pipetting channel, and after adjustment of the determined working gas pressure in the pipetting channel, to acquire the piston position of the pipetting piston, and compare the acquired piston position with a target piston position associated to at least one of the represented target residual quantity and the determined working gas pressure, and depending on the quality of the comparison result representing the dispensing sequence, to produce an output representing the determined quality.

3. The pipetting device according to claim 1, wherein the starting quantity value is a starting position of the pipetting piston at the start of the dispensing sequence.

4. The pipetting device according to claim 1, wherein the control device is configured to determine the target dispensed quantity value on the basis of the number of single-volume dispensing runs of the dispensing sequence and of the target single volumes to be dispensed associated to the single-volume dispensing runs.

5. The pipetting device according to claim 2, wherein the control device is configured to determine the target piston position on the basis of the starting quantity value and of the target dispensing quantity value.

6. The pipetting device according to claim 2, wherein the control device is configured to determine the target piston position from a data relation recorded for the dosing liquid in the data memory, in which for the dosing liquid a target piston position is associated to each of a number of represented target residual quantities.

7. The pipetting device according to claim 2, wherein the control device is configured to actuate into motion a moveable component that can be actuated into motion by the control device as a discernible indication of the determined quality.

8. The pipetting device according to claim 2, wherein the pipetting device exhibits at least one of, at least one of an output device for visual and, acoustic and haptic information output and the control device is configured to actuate the output device to output visual and/or acoustic and/or haptic Information as a discernible indication.

9. The pipetting device according to claim 2, wherein the control device is configured, when the comparison of the acquired piston position with the target piston position yields that the acquired piston position is quantitatively nearer by more than a specified first tolerance interval to a pipetting aperture through which dosing liquid is dispensed from the pipetting channel than the target piston position, to produce a discernible output of information which represents the dispensing of a larger dosing liquid quantity than the target total quantity, and/or when the comparison of the acquired piston position with the target piston position yields that the acquired piston position is quantitatively further away by more than a specified second tolerance interval from the pipetting aperture than the target piston position, to produce a discernible output of information which represents the dispensing of a smaller dosing liquid quantity than the target total quantity, and/or when the comparison of the acquired piston position with the target piston position yields that the acquired piston position conforms within a specified tolerance band to the target piston position, to produce a discernible output of information which represents the dispensing of a dosing liquid quantity that conforms sufficiently to the target total quantity.

10. The pipetting device according to claim 1, wherein the pipetting device is configured for the aspiration of dosing liquid in the pipetting channel.

11. The pipetting device according to claim 1, wherein the dispensing sequence comprises more than ten single-volume dispensing runs.

12. The pipetting device according to claim 2, wherein in the data memory at least one residual quantity-working gas pressure data correlation is recorded for each of a large number of dosing liquids.

13. The pipetting device according to claim 6, wherein in the data memory at least one residual quantity-piston position data relation is recorded for each of a large number of dosing liquids, in which a target piston position is associated to each of a number of represented target residual quantities.

14. The pipetting device according to claim 1, wherein at least one characteristic substance value such as density, viscosity, and the like is recorded in the data memory for a large number of dosing liquids.

15. The pipetting device according to claim 1, wherein the pipetting device exhibits a temperature sensor which acquires the temperature of at least one of the working gas and of a dosing liquid quantity accommodated at least one of in the pipetting channel and of a section of the pipetting channel and transmits it to the control device.

16. A method for determining the dosing quality of a dispensing sequence of a pipetting device working according to the air displacement principle, where the dispensing sequence comprises at least one pulsed single-volume dispensing run of a dosing liquid with a target single volume to be dispensed of less than 1 which through generation of an overpressure pulse of less than 50 ms pulse duration in a compressible working gas present between a pipetting piston and a dosing liquid supply in the pipetting channel of the pipetting device is delivered from the dosing liquid supply, where the method comprises the following steps:

determining a target residual quantity value, which represents a residual quantity of dosing liquid remaining in the pipetting channel at the end of the dispensing sequence, determining a working gas pressure associated to the represented target residual quantity which is required in order to maintain the target residual quantity in the pipetting channel in a predetermined state, actuating a piston drive for adjusting the determined working gas pressure in the pipetting channel, after adjustment of the determined working gas pressure in the pipetting channel: acquiring the piston position of the pipetting piston, comparing the acquired piston position with a target piston position associated to at least one of the represented target residual quantity and to the determined working gas pressure, and producing an output representing the determined dosing quality as a function of the comparison result representing the dosing quality of the dispensing sequence.

17. A computer program product on a data medium, comprising a sequence of operating instructions executable through an electronic computing unit, which executed on an electronic computing unit, which is linked with a pipetting device according to claim 1, so as to allow signal transmission, effects the execution of the the following steps:

determining a target residual quantity value, which represents a residual quantity of dosing liquid remaining in the pipetting channel at the end of the dispensing sequence, determining a working gas pressure associated to the represented target residual quantity which is required in order to maintain the target residual quantity in the pipetting channel in a predetermined state, actuating a piston drive for adjusting the determined working gas pressure in the pipetting channel, after adjustment of the determined working gas pressure in the pipetting channel: acquiring the piston position of the pipetting piston, comparing the acquired piston position with a target piston position associated to at least one of the represented target residual quantity and the determined working gas pressure, and producing an output representing the determined dosing quality as a function of the comparison result representing the dosing quality of the dispensing sequence.

18. The pipetting device according to claim 1, wherein the dispensing sequence comprises more than 20 single-volume dispensing runs.

19. The pipetting device according to claim 1, wherein the dispensing sequence comprises more than 30 single-volume dispensing runs.

* * * * *